Oct. 27, 1942.     W. H. SMYERS     2,300,072
ELECTRICAL CONDENSER
Filed May 13, 1939
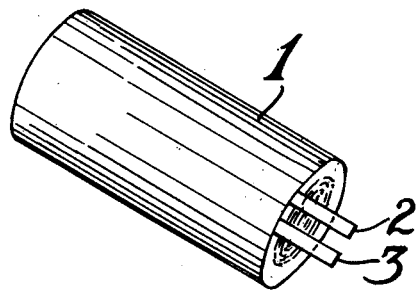
FIG.—1
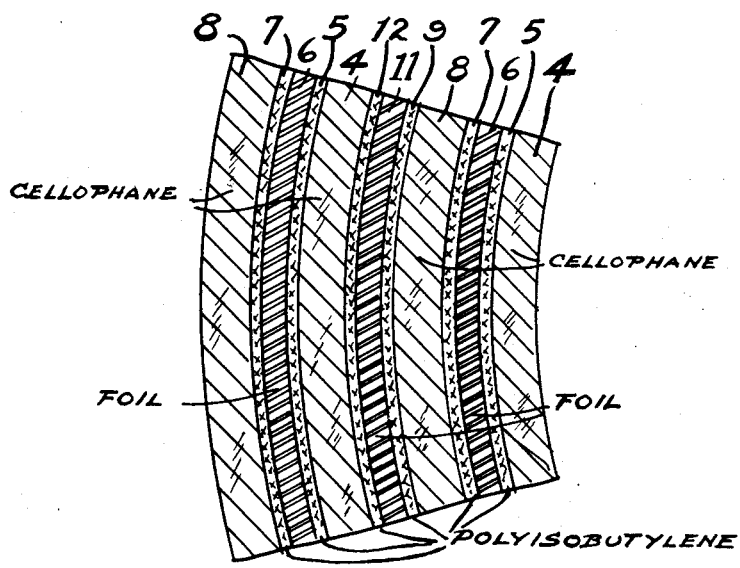
FIG.—2
William H. Smyers Inventor
By _____ Attorney Patented Oct. 27, 1942

2,300,072

UNITED STATES PATENT OFFICE 2,300,072

ELECTRICAL CONDENSER

William H. Smyers, Westfield, N. J., assignor, by mesne assignments, to Jasco, Incorporated, a corporation of Louisiana Application May 13, 1939, Serial No. 273,467

15 Claims. (Cl. 175—41)

This invention relates to electrical condensers, and particularly to a new type of electrical condenser utilizing layers of homogeneous, smooth surface, insulating material and foil, and relates especially to the combination of regenerated cellulose sheets and adhesive hydrocarbon polymer as the insulating material in a condenser.

In the making of rolled foil condensers for electrical service, it has been customary to roll up alternate layers of paper, preferably treated with paraffin, and foil, usually tin or aluminum foil, until a sufficient area of foil has been rolled to provide the desired electrostatic capacity. The electrostatic capacity per unit area of foil surface is a function by the spacial separation between the respective foil plates of the condenser, and a function of the dielectric constant of the interposed insulating material. Thus, the thinner the insulation between the foil plates of the condenser, the greater the capacitance of a given area of foil electrode surface, and a condenser may be smaller and contain less material for a given capacitance when the insulating material is thin than when it is thick. However, a primary requirement in any condenser is that the breakdown voltage of the insulating material interposed between the plates must be sufficiently high to withstand indefinitely the peak voltage applied between the plates of the condenser. Thus, strict limits in thinness of the permissible condenser dielectric occur which prevent more than very slight reduction of the spacing between the foil plates of the condenser.

But the breakdown voltage in any dielectric is a function of the distribution of the potential gradient. If the interposed dielectric is homogeneous, the electrostatic gradient between the plates occurs as smooth, even curves, with no foci or points of concentration of electrostatic forces.

To the present, however, it has not been possible to find homogeneous materials in thin sheets suitable for condenser dielectric. Paper is a matted body of fibres, with interspersed air between and around the cellulose fibres. Accordingly, the surface of every fibre is a focal point for a concentration of potential gradient which builds up quite rapidly, and readily reaches values sufficiently high to ionize the adjacent air, resulting in an immediate electrical breakdown and puncture of the dielectric material, whereupon the condenser becomes completely useless since the charring of the paper incident to the first passage of current, whether spark or arc, develops a conducting spot through the insulation. The introduction of a thorough impregnation of the paper by paraffin modifies the distribution of the electrostatic gradient in a favorable direction, and substantially increases the breakdown voltage of the paper, both by removal of the readily ionizable air, and by reduction of the voltage gradient concentration, since there is less difference in the dielectric constant of paraffin compared to cellulose fibres than there is between cellulose fibres and air. Thus a condenser made with paraffined paper for the dielectric will withstand greatly increased voltage which may be two or three times the permissible voltage with a plain paper and foil condenser. However, even paraffin is not satisfactory, since it does have a dielectric constant different from cellulose and there are residual foci in the dielectric gradient between the plates.

A desirable dielectric for rolled condensers is regenerated cellulose, known under the trade name of "Cellophane," but to the present this has not been usable, mainly because of the difficulty of assembling the condenser. Cellophane is a material to which relatively few substances will adhere, and accordingly very great difficulty is experienced in rolling together plain "Cellophane" and foil, since the two will not adhere, will not stay rolled, and the foil does not stay centered in the sheet of "Cellophane." Furthermore, in view of the easy-tearing character both of "Cellophane" and of foil, especially the latter, it is not possible to roll the condenser under sufficient tension to hold the various parts together. Also, air pockets occur between the "Cellophane" and foil which serve as foci for concentration of the voltage gradient between the plates.

The present invention makes use of the new and unexpected fact that a polyisobutylene having a molecular weight above about 1,000 and possibly as high as 300,000 or higher but preferably lying between about 3,000 and 25,000 in some cases and between about 100,000 and 200,000 in other cases, is strongly adhesive both to "Cellophane" and to metal foil. Intermediate polymers may of course also be used. Accordingly, the condenser of the present invention utilizes homogeneous layers of "Cellophane" coated on one or both sides with films of adhesive polyisobutylene and layers of metal foil, bonded to the layers of "Cellophane" by the adhesive effect of the polyisobutylene.

Thus the electrostatic condenser of the invention consists of plates formed of metal foil, between which are interposed one or more homogeneous layers of "Cellophane," coated with thin homogeneous layers of polyisobutylene. The regenerated cellulose forming the "Cellophane" layer is wholly homogeneous, and accordingly there are no focal points for concentrating the electrostatic gradient between the boundary planes of the "Cellophane" sheet; similarly, the layer of polyisobutylene also is homogeneous, and accordingly there are no focal points for the electrostatic gradient in the polyisobutylene. The fact that both the polyisobutylene and regenerated cellulose are amorphous and non-crystalline makes both completely homogeneous, whereas crystalline materials have variations in voltage gradient at the surfaces of the crystals. Likewise, the boundary surfaces of both layers are smooth plane surfaces, and accordingly while there is a change in the slope of the potential gradient at the interface, there are no focal points and accordingly no undue concentrations of voltage gradient. Also, the dielectric constants of "Cellophane" and of polyisobutylene are so nearly the same that there is very little change in the slope of the voltage gradient even at the interface.

Thus the structure of the invention consists of a combination of metal foil condenser plates with interposed dielectric material in the form of homogeneous layers of "Cellophane" and polyisobutylene, the whole being if desired rolled into a cylindrical condenser, or folded into a flat condenser, or otherwise arranged according to the customary and usual procedure.

Thus an object of the invention is to avoid voltage gradient focal points in the dielectric of an electrostatic condenser and to insulate the plates of the condenser with a material of high dielectric constant, high breakdown strength, and free from focal points of voltage gradient concentration, utilizing homogeneous layers of regenerated cellulose and polymer having smooth boundary planes between the condenser electrodes.

Other objects and details of the invention will be apparent from the following description when read in connection with the accompanying drawing wherein Fig. 1 is a view in perspective of a rolled condenser according to the invention, and Fig. 2 is a sectional view of a portion of a condenser constructed according to Fig. 1.

The polyisobutylene may be prepared as follows:

In the processing of crude oil to produce extra quantities of gasoline boiling range hydrocarbons by cracking the crude oil or fractions boiling higher than gasoline, e. g., gas oil, kerosene, lubricating oil, etc., at elevated temperatures, there is produced about 15% on the weight of crude oil charged, of gaseous materials consisting of hydrogen, methane and its gaseous homologues, ethylene and its gaseous homologues, etc., including substantial quantities of isobutylene. It is found that isobutylene when condensed by cooling to a low temperature, below $-10°$ C., e. g., $-40°$ C., $-80°$ C., or $-100°$ C., diluted with a diluent-refrigerant such as liquefied propane, butane, ethylene, etc., and treated with an active halide Friedel-Crafts catalyst, e. g., boron trifluoride, polymerizes into a substantially colorless, high molecular weight hydrocarbon material of relatively very low unsaturation compared to the original isobutylene.

After the polymerization at the low temperature is complete, the polymeric material is separated from the diluent-refrigerant and other materials, and desirably purified by a careful washing and kneading operation. The material usually is used in dissolved form, and it is convenient at this stage to dissolve it in solvent and either settle or filter the solution, in order to remove any fragments of metal or other foreign material which may have entered the polymer in the course of washing and kneading operations.

This polymer appears to be a branched, linear chain hydrocarbon which is substantially saturated having an iodine number usually less than 5 and often as low as or lower than 1, and is readily made with a molecular weight ranging from about 1,000 up to 300,000 or above, according to the purity of the isobutylene, and the lowness of the temperature at which polymerization occurs; several commercial forms are now marketed, namely: about 15,000; 80,000; and about 150,000, m. w. A desirable material for the structure of the present invention when there is no pressure to force the polymer out of its insulating position, is a polyisobutylene having an average molecular weight as determined by the Staudinger viscosity method lying between about 3,000 and about 25,000 or 27,000. This material is a solid but very sticky substance, plastic but not readily melted, and is very resistant to oxidation, hydration, or attack by chemical agents, e. g., acids, alkalis, etc. When resistance to flow or displacement under pressure is desired, a polymer having a much higher molecular weight should be used, e. g., preferably at least 100,000.

"Cellophane," as is well known, is a regenerated cellulose, produced by mercerizing cellulose such as cotton linters or specially purified wood fibre paper pulp. The cellulose pulp is preferably laid into thick sheets having a characteristic texture much like that of blotting paper, and the dried sheets are steeped in 15% sodium hydroxide solution, usually for a period of about 4 hours, whereafter the greater portion of the caustic solution is squeezed out, taking with it in solution most of the alpha cellulose. The steeped, moist sheets are then disintegrated, or crumbed, and aged for a period of time which is conveniently about 4 days. At the end of the ageing period the material is "tumbled" with a quantity of carbon disulfide, to form cellulose xanthate, which thereafter is dumped directly into a suitable quantity of caustic soda solution, preferably about 6% concentration, in which substantially the whole of the cellulose xanthate is soluble. The solution is then filtered and aged for another period, also usually about 4 days, and thereafter is coated, preferably upon a polished wheel. Immediately after the coating, the viscous coat on the wheel is coagulated by the application thereto of an aqueous solution containing approximately 25% of sodium sulfate and from 20% to 35% of sulfuric acid. The application of the acid solution abstracts the sodium from the viscose solution, frees the carbon disulfide and precipitates the dissolved cellulose as a regenerated cellulose or cellulose hydrate in the form of a relatively thin, transparent film. The film is desirably washed through several acid solutions, and then through water, to remove all of the acidic and alkaline bodies, to leave as pure a regenerated cellulose as possible.

For commercial uses, such as wrapping tissue, the cellulose film is frequently treated with glycerine or other flexibilizing agents. For the condenser use, however, this treatment is omitted and instead the film is dried as thoroughly as possible.

When so prepared, the "Cellophane" film has a breakdown voltage or dielectric strength of approximately 80,000 volts per millimeter thickness (2,000 volts per mil thickness) and a dielectric constant of approximately 7. In comparison, the polyisobutylene, as above prepared, has a breakdown voltage of approximately 23,000 volts per millimeter thickness (600 volts per mil thickness) and a dielectric constant of approximately 2.3 to 2.5.

Both materials have very high resistivity values, that for polyisobutylene being greater than $10^{15}$ ohms per centimeter cube, and for "Cellophane" being comparable or slightly lower.

The metal foil forming the plates of the condenser may be any of the usual forms of foil such as tin foil, either pure tin or alloyed with lead, or may be aluminum foil, either in pure form or in the various alloys used for this purpose. It is especially important to have the metal foil free from pin holes, cracks or defects, although this precaution is not as important with the present invention as with waxed paper, because the polyisobutylene tends to fill small holes and so tends to prevent premature breakdown.

In the assembling of the condenser, for low voltage service, a single thickness of "Cellophane" may be utilized. This is preferably coated upon both sides with the polyisobutylene. If material having a molecular weight near the bottom of the suggested range is used, it may be coated directly upon the "Cellophane," being sufficiently plastic to adhere directly in the form of a thin, homogeneous coating. Alternatively, if polymers of the higher range, or solid polymers of relatively low tackiness having molecular weights at the suggested high, desirable range are used, the material may conveniently be applied in solution in a volatile solvent, e. g., naphtha, liquefied gaseous hydrocarbons such as pentane, butane or even propane, carbon tetrachloride, etc. In either event the "Cellophane" is preferably coated between rolls if the solid polymer is used, and thereafter is rolled directly upon a small mandril with the interleaved foil which forms the plates of the condenser. It is, of course, desirable that two strips of coated "Cellophane" be utilized, together with two strips of foil. The whole is desirably rolled into the cylindrical condenser 1 as shown in Fig. 1, and connecting tabs 2 and 3 to the respective strips of foil are provided.

The condenser then takes the form as shown in the enlarged view of Fig. 2 in which a sheet of "Cellophane" 4 has coated thereon a layer of the polymer material 5 adherent thereto and similarly adherent to a layer of foil 6. Over the layer of foil 6 is a second layer of the polymer material 7 which is adherent to the foil, and also adherent to a second layer of "Cellophane" 8. The farther side of the "Cellophane" 8 is also coated with a layer of polymer 9 which is adherent both to the surface of the "Cellophane" and to the foil 11. On the second side of the foil 11 is still another coating of polymer 12 which is adherent to the foil 11, and also adherent to the second turn of the first layer of "Cellophane" 4 which in turn is covered with a continuation of the first coating of polymer 5, the first layer of foil 6, the second coating of polymer 7, and the second strip of "Cellophane" 8 which is continued until the desired number of turns and area of foil electrodes have been rolled up.

The preferred embodiment, as above described, is a rolled or folded type of condenser. It is, however, possible to produce other forms, such as stacked rectangular pieces of foil and coated "Cellophane" in alternation, although this form of condenser is of commercially much less consequence. Similarly, there are occasional uses in which a guard strip is required, and accordingly three or more strips of foil may be utilized in various adjacent relationships. In view of these facts, it will be obvious that many other embodiments of electrostatic condensers can be constructed utilizing foil, "Cellophane" and the polymeric material.

It will be observed that during the rolling of the condenser, the plastic character of the polymer avoids the formation of air bubbles between the foil and dielectric, since under the rolling pressure all traces of air are effectively squeezed out of the condenser. This characteristic further improves the quality of the condenser, since it removes all danger of ionization of air within the body of the dielectric. Furthermore, the removal of all traces of air, even though it is readily accomplished with the present construction, is of much less consequence, since the polymeric material is exceedingly resistant to oxidation from either air or ozone, and small air bubbles remaining adjacent the foil plates, even though they might be ionized, are without harm to the condenser, in sharp contrast and distinction to all other types of dielectric suitable for rolled condensers.

Thus the smooth layers of foil 6 and 11 are separated by three-layer dielectric bodies, each of the layers being homogeneous and free from focal points for voltage gradients and each being bounded by smooth surface planes at which only a minor change in slope of the voltage gradient curve occurs. Thus the lack of focal points for voltage gradient greatly increases the permissible voltage between electrode surfaces, and greatly increases the working voltage of the condenser for a given thickness of dielectric.

For higher voltage condensers, where one thickness of "Cellophane" and polymer is insufficient to withstand the applied voltage, a plurality of layers of "Cellophane" may be utilized, the successive layers of "Cellophane" being held together by thin interposed films of polymer substance. By this procedure any desired number of layers of "Cellophane" may be utilized to build up a thickness of dielectric sufficient to withstand the desired voltage.

It is to be observed that cellulose is generally considered to be a high molecular weight carbonaceous material and is a branched, linear hydrocarbon chain compound containing a limited number of hydroxyl groups on the chain; likewise the polymer substance is a high molecular weight carbonaceous material consisting of a branched chain hydrocarbon but not containing any hydroxyl groups. (The polymer has a double bond between the last two carbons at one end of the chain although the whole molecule is relatively so large that this one double bond does not produce any substantial amount of chemical unsaturation in the compound.) This similarity in chemical structure results in dielectric constants for the two materials which are so nearly the same that the change in slope of the voltage gradient at the interface between the cellophane layer and the polymer layer is very small, thereby still further smoothing out the voltage gradient curve between plates, and increasing the permissible applied voltage.

Such a condenser with a single sheet of cellophane between sheets of foil is desirably produced with the cellophane thickness at a value of about 2½ to 3½ mils (thousandths of an inch) and the polyisobutylene layers are desirably each about ½ mil in thickness. Such dimensions produce a condenser which will give reliably continuous service on ordinary sine wave form A. C. at impressed R. M. S. voltages of 300 to 900, at a good safety margin, depending upon the presence, amplitude, and wave shape of transients, or other abnormal voltage surges.

When several layers of "Cellophane" are interposed between the foil sheets the permissible voltage is increased more than proportionately, because of the better distribution of voltage gradients produced by the interposed film of polyisobutylene.

The operating voltages are raised above those ordinarily usable on paper condensers because of the smooth, even voltage gradients, and the absence of ionization phenomena, due to absence of air bubbles, absence of voltage gradient concentration, and the high resistance of the materials to ionization, which is particularly characteristic of the polyisobutylene.

The above-described embodiments of the invention utilize preferably polyisobutylene having an average molecular weight lying between about 3,000 and about 15,000 to 27,000, since this range of molecular weights contains the most powerfully sticky and adhesive forms of the polymer. However, the molecular weight polymers above 27,000 are also usable, as mentioned above.

Another advantage of the combination is the sealing effect against moisture produced by the polyisobutylene for the benefit of the "Cellophane." The very high resistance of the polyisobutylene to water and moisture provides a very valuable protection to the electric strength and properties of the "Cellophane," which is not obtainable in other substances.

Alternatively, other plastic solid polymers are usable, e. g., polymers of 2 methyl butene-1, or of mixed olefines or even of lower olefines such as ethylene and propylene. It is also possible to use polymers made by polymerizing together isoolefines and diolefines such as isobutylene and butadiene, or isobutylene and isoprene or chloroprene and also ethyl methyl ethylene (2 methyl butene-1) and butadiene or isoprene or chloroprene, under conditions to produce a plastic high molecular weight (i. e., above 1,000 or so) linear type. These copolymers contain usually less than 10% down to 1% or slightly under of the diolefin, and show the interesting property of being chemically nearly saturated, having an iodine number less than 50 and usually less than 20 (in contrast to rubber, which has an iodine number of 340 to 360). The polymer is chemically reactive with elemental sulfur, when heated, especially in the presence of sulfurization compounds such as Tuads (tetra methyl thiuram disulfide), whereby they undergo a further condensation to a high tensile strength product. These polymers also are prepared by the use of a Friedel-Crafts type catalyst, preferably aluminum chloride, dissolved in ethyl or methyl chloride at temperatures from −50° C. down to −150° C. These polymers likewise may be applied to the "Cellophane" sheet or to the foil, from solution in a suitable solvent such as naphtha, carbon tetrachloride, cloroform, etc., and the solution also desirably contains elemental sulfur in a proportion of approximately 5% of the polymer material, and also the above-mentioned Tuads in the proportion of ½% on the polymer material. This form of polymer adheres well to both the "Cellophane" and the foil, and in addition has the property of being cured under heat and pressure to form a tough and powerfully adhesive layer between the foil and the regenerated cellulose sheet.

In this embodiment of the invention, the foil or the "Cellophane" or both may be coated with a very thin layer of the polymer material including the sulfur and the sulfur compound, and the foil and cellulose sheet may then be rolled up together and thereafter cured by the application of heat and pressure at a temperature of 120° C. to 180° C. for a period of 15 to 60 minutes.

This embodiment of the invention produces an electrostatic condenser in which the successive layers of dielectric and foil are bound into a solid unitary whole by the cured polymer material.

If desired, about 10 parts by weight of the polymer to be used may be mixed with or dissolved in 1 to 50 parts of one or more materials serving as hardeners, such as paraffin wax or petrolatum wax or various other natural or synthetic waxes sufficiently compatible with the polymer, or various resins, especially hard hydrocarbon resins of petroleum origin, e. g., those made from cracking coil tar or from vapor phase cracked petroleum hydrocarbon gases. Such hardeners are desirable addition agents when the polymer composition is to be used in making rigid condensers not subjected to severe jarring or vibration. For some purposes, as for low-cost, low-voltage condensers, bituminous materials, e. g., asphalt or tar preferably of petroleum origin, may be admixed with the polymer. In other cases, where flexibility is desired and ability to stand up under vibration and shock, rubber or rubber-like materials may be used instead of the hardeners mentioned above and the resulting composition may be vulcanized if desired; the rubber and polymer may be mixed either by milling or by dissolving the polymer alone or with paraffin wax for example, in a volatile solvent, e. g., naphtha, swelling comminuted rubber in the resultant solution, spreading on the "Cellophane" or metal foil surface and evaporating the solvent as described in applications Serial No. 670,730, filed May 12, 1933; No. 704,747, filed December 30, 1933; No. 170,048, filed October 20, 1937; and No. 185,519, filed January 18, 1939; of which the present application is a continuation-in-part.

The combination of foil, "Cellophane" and ploymer as above described is of very great advantage in the construction of electrostatic condensers. It is also of outstanding value in the construction of the device known as condenser type transformer bushings, which are particularly advantageous in the smaller sizes in connection with small high tension transformers. As is well known, the problem of carrying the wire leads to a transformer through the metal case is relatively difficult of solution, because of the concentration of potential gradient by the metal case of the transformer which leads to difficulties with ionization and other phenomena which tend toward an early breakdown of the insulating bushings carrying the leads to the condenser windings. This problem has been solved by the use of rolled dielectric bushings around the conductor leads with interposed layers of foil which serve to distribute the dielectric stresses. Large bushings are customarily made of foil paper and Bakelite. Small bushings have to the present been neglected. The present structure is particularly advantageous for the construction of small bushings suitable for lower power transformers such as instrument transformers, and particularly suitable for small power, high voltage transformers used for vacuum tube supply purposes.

The combination of foil "Cellophane" and polymer is also advantageous for many other uses such as the electrodes in ionization chambers of various types, and for many other purposes where a metal film carried upon an organic material film base is desirable.

The present embodiments of the invention utilize the regenerated cellulose material known as "Cellophane," but the invention equally includes other homogeneous cellulosic sheets, such as sheets or films of cellulose nitrate, cellulose acetate and other cellulose esters and ethers. These materials do not ordinarily have as high a breakdown voltage as does the "Cellophane," but they are more easily prepared in thicker films, and are of somewhat higher tensile strength, for which reason they are preferable in some embodiments.

Thus the device of the invention provides a combination of a metal foil, a cellulosic sheet, and a polymeric material interposed between the foil and cellulosic sheet. The device of the invention is particularly advantageous for electrostatic condensers of various types and for electrodes of various types, but it obviously is useful for many other purposes.

While there are above disclosed but a limited number of the embodiments of the structure of the invention, it is possible to produce still other embodiments without departing from the inventive concept herein disclosed, and it is therefore desired that only such limitations be imposed upon the appended claims as are stated therein or required by the prior art.

The invention claimed is:

1. An electrostatic condenser comprising a pair of electrodes, and an interposed dielectric material therebetween, the said dielectric material comprising a plurality of homogeneous layers of insulating material of regenerated cellulose and a plastic substantially saturated linear chain hydrocarbon polymer.

2. An electrostatic condenser comprising a pair of metal foil plates and a homogeneous dielectric interposed therebetween comprising a film of regenerated cellulose and a film of polyisobutylene.

3. An electrostatic condenser comprising a pair of metal foil plates and a homogeneous dielectric interposed therebetween comprising a film of regenerated cellulose and a plurality of films of polyisobutylene between the surfaces of said regenerated cellulose and said foil plates.

4. An electrostatic condenser comprising a pair of metal foil plates and a homogeneous dielectric interposed therebetween comprising a plurality of films of regenerated cellulose and a plurality of films of polyisobutylene.

5. An electrostatic condenser comprising a sheet of regenerated cellulose, a coating of polyisobutylene upon the respective sides thereof, and metal electrode plates adherent to said polyisobutylene.

6. An electrostatic condenser comprising a sheet of regenerated cellulose, a coating of polyisobutylene having a molecular weight lying within the range of 3,000 to 25,000 upon the respective sides thereof, and metal electrode plates adherent to said polyisobutylene.

7. The method of making an electrostatic condenser from an isobutylene polymer having a high molecular weight, sticky character, comprising the steps of, coating the said polymer in a thin film upon sheets of regenerated cellulose and rolling the coated sheets of regnerated cellulose with a pair of metal foil plates.

8. The method of making an electrostatic condenser from an isobutylene polymer having a high molecular weight, sticky character, comprising the steps of, coating the said polymer from solution in a solvent upon sheets of regenerated cellulose and rolling the coated sheets of regenerated cellulose with a pair of foil plates.

9. The method of making an electrostatic condenser from an isobutylene polymer having a high molecular weight, sticky character, comprising the steps of, coating the said polymer from solution in carbon tetrachloride upon sheets of regenerated cellulose and rolling the coated sheets of regenerated cellulose with a pair of foil plates.

10. The method of making an electrostatic condenser from an isobutylene polymer having a high molecular weight, and sticky character and having a molecular weight within the range approximately of 8,000 to 20,000 comprising the steps of coating the said polymer upon sheets of regenerated cellulose and rolling the coated sheets of regenerated cellulose with a pair of foil plates.

11. An electrostatic condenser comprising a pair of metal foil plates and a homogeneous dielectric interposed therebetween comprising a film of regenerated cellulose and a film of interpolymerized isoolefin and diolefin.

12. An electrostatic condenser comprising a pair of metal foil plates and a homogeneous dielectric interposed therebetween comprising a film of regenerated cellulose and a film of interpolymerized isoolefin and diolefin, the said polymer film comprising sulfur, and being cured by the application thereto of heat and pressure.

13. An electrostatic condenser comprising a pair of metal plates and a homogeneous, laminar dielectric interposed therebetween comprising a sheet of regenerated cellulose and a film of interpolymerized isobutylene and diolefin.

14. An electrostatic condenser comprising a pair of metal plates and a homogeneous, laminar dielectric interposed therebetween comprising a sheet of regenerated cellulose and a film of interpolymerized isobutylene and butadiene.

15. An electrostatic condenser comprising a pair of metal plates and a homogeneous, laminar dielectric interposed therebetween comprising a sheet of regenerated cellulose and a film of interpolymerized isobutylene and diolefin.

WILLIAM H. SMYERS.